United States Patent [19]

Gliemeroth et al.

[11] 4,243,299
[45] Jan. 6, 1981

[54] OPTICAL FIBERS FOR COMMUNICATION TRANSMISSION HAVING HIGH STABILITY TO NUCLEAR RADIATION

[75] Inventors: Georg Gliemeroth, Mainz-Finthen; Lothar Meckel, Oestrich-Winkel; Peter Heinemann, Wiesbaden, all of Fed. Rep. of Germany

[73] Assignee: JENAer Glaswerk Schott & Gen., Mainz, Fed. Rep. of Germany

[21] Appl. No.: 941,691

[22] Filed: Sep. 12, 1978

[30] Foreign Application Priority Data

Sep. 14, 1977 [DE] Fed. Rep. of Germany ....... 2741314

[51] Int. Cl.² ................................................ G02B 5/14
[52] U.S. Cl. .............................. 350/96.34; 350/96.30
[58] Field of Search ............... 350/96.29, 96.30, 96.31, 350/96.33, 96.34; 65/3 R, 3 A

[56] References Cited

U.S. PATENT DOCUMENTS

| 3,784,386 | 1/1974 | Araujo et al. | 350/96.30 |
| 3,999,836 | 12/1976 | Wolf | 350/96.34 |

OTHER PUBLICATIONS

G. Sigel Jr. et al., "Effects of Ionizing Radiation on Transmisson of Optical Fibers," *Appl. Phys. Letts.* vol. 24, No. 9, May 1974 pp. 410–414.

*Primary Examiner*—Stewart J. Levy
*Attorney, Agent, or Firm*—Millen & White

[57] ABSTRACT

An optical fiber comprising a light-conducting core and a borosilicate glass optical insulation cladding thereon is stabilized against the effects of nuclear radiation by incorporating in the core and the cladding an amount of $Sb_2O_3$ effective to harden the fiber against nuclear radiation. Amounts of 0.002–6 wt. % $Sb_2O_3$ are generally useful.

15 Claims, 5 Drawing Figures

FIBER RADIUS

OPTICAL FIBERS FOR COMMUNICATION TRANSMISSION HAVING HIGH STABILITY TO NUCLEAR RADIATION

BACKGROUND OF THE INVENTION

The present invention concerns a novel, communication-transmitting optical fiber which has high stability to nuclear radiation.

Optical fibers for communication must be distinguished by low transmission losses of less than 20 db/km, preferably of less than 10 db/km, and by a low pulse dispersion of less than 6 ns/km, preferably less than 4 ns/km, if they are to be suitable for the transmission of information over more than 500 m at an adequate bandwidth of more than 100 megahertz.

Such fibers have been developed recently, for example, those disclosed in DAS No. 2,546,162 (British patent application No. 42779/76; U.S. patent application Ser. No. 732,197 now U.S. Pat. No. 4,148,621), whose disclosures are incorporated by reference herein. With reference to FIG. 1a, these fibers have a light-conducting core 1 made of a multicomponent glass surrounded by an outer sheath made of a silica glass 3. They are made by coating the inside of a silica tube with a series of multicomponent glass layers, each successive layer having a higher index of refraction (n) than the previous one, so that the overall index of refraction profile for the core is that of a parabola (see FIG. 1b). The coated tube is subsequently collapsed and drawn to form the fiber. Preferably, the layers are deposited using the Schott High Temperature CVD Process (see copending U.S. application Ser. No. 941,692, filed on Sept. 12, 1978.

A preferred optical fiber has an intermediate cladding, i.e., an optical insulation zone 2, between the multicomponent glass core and the exterior silica glass sheath. (See, for example, British Pat. No. 1,436,605; J. Am. Ceramic Soc. 58 (5-6), 261 (1975); U.S. Pat. No. 3,963,469.) This optical insulation zone is made of a borosilicate glass ($B_2O_3$-$SiO_2$) cladding, which can also be deposited by CVD techniques.

Although such fibers have excellent properties under normal usage, after being exposed to the effects of nuclear radiation, their properties (attenuation of transmission; dispersion of pulsewidth, etc.) significantly deteriorate. Consequently, the use of communication fibers having such pronouncedly good properties generally becomes impossible if higher doses of such radiation are impinged on such fibers. For example, loads of $10^4$ rad make the use of such fibers impossible, despite the fact that otherwise they would actually be more suitable for interference-free transmission than electromagnetic or electric transmission lines. This deterioration in performance is especially due to the fact that such radiation loads very strongly damage the core glass and the optically insulating borosilicate glass zones, thus leading to high transmission losses due to the irradiation.

SUMMARY OF THE INVENTION

Therefore, it is an object of this invention to provide an optical fiber for communication, having maximum stability against nuclear radiation, and being especially useful in the near infrared range of the spectrum, i.e. in the region in which most conventional light transmitters and light receivers operate e.g., lasers and LED's.

It is another object of this invention to provide such a nuclear hardened optical fiber which has a light-conducting core and a surrounding, light-insulating borosilicate glass zone (cladding).

It is a further object of this invention to provide such a nuclear hardened optical fiber whose core and cladding have been deposited by CVD, preferably the Schott High Temperature CVD Process, and whose core is of a multicomponent glass and has a parabolic index of refraction profile increasing inward.

Upon further study of the specification and appended claims, further objects and advantages of this invention will become apparent to those skilled in the art.

These objects have been attained by admixing in the light-conducting glass core of such a fiber (e.g., multicomponent core) and in the optical insulating zone made of borosilicate glass which surrounds this core, an amount of $Sb_2O_3$ effective to harden, i.e., stabilize the fiber against nuclear radiation.

BRIEF DESCRIPTION OF THE DRAWINGS

Various other objects, features and attendant advantages of the present invention will be more fully appreciated as the same become better understood when considered in conjunction with the accompanying drawings, in which like reference characters designate the same or similar parts throughout the several views, and wherein.

DETAILED DISCUSSION

A typical basic structure of a fiber of this invention is shown in FIG. 1. A silica glass tube 3 is first coated on its inside surface with a borosilicate glass layer(s) 2 containing $Sb_2O_3$ in accordance with this invention. This borosilicate glass zone is then inside coated with the light-conducting core layers, preferably multicomponent glass layers, consisting of a series of layers each having a different index of refraction, increasing in the inward direction, this core also containing $Sb_2O_3$ in accordance with this invention.

The light-conducting cores and borosilicate optical insulation zones of the fibers can be fabricated by any conventional method and can have any conventional composition and structure such as those disclosed for cores in: U.S. Pat. Nos. 3,711,262 and 3,823,995 and DAS No. 2,546,162 (British patent application No. 42779/76 and the like; and for borosilicate optical insulation zones—British Pat. No. 1,436,605; J. Am. Ceramic Soc. 58 (5-6), 261 (1975); and U.S. Pat. No. 3,963,468 and the like; all the disclosures of which being incorporated by reference herein.

Figure 1A:
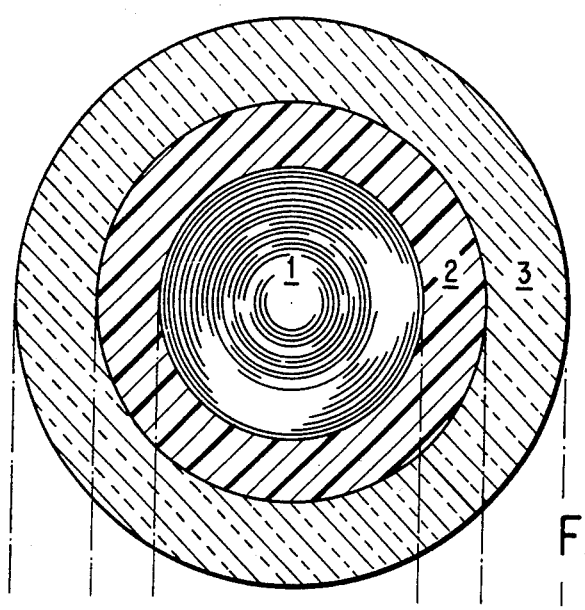
FIG. 1a illustrates the cross section of an optical fiber of this invention.
Figure 1B:
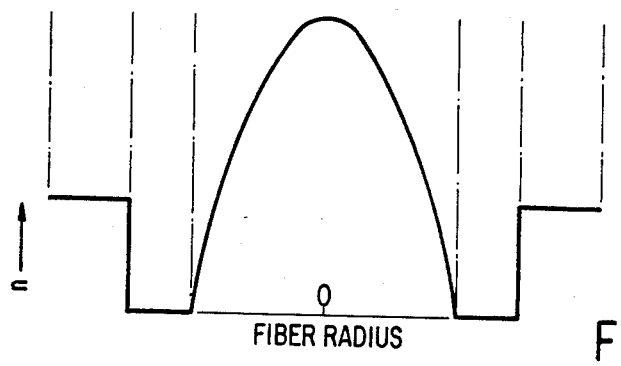
FIG. 1b shows a refractive index profile thereof.
Figure 1C:
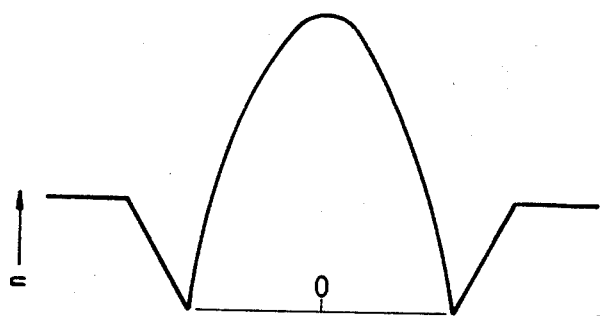
FIGS. 1c and 1d show alternate such refractive index profiles.
Figure 1D:
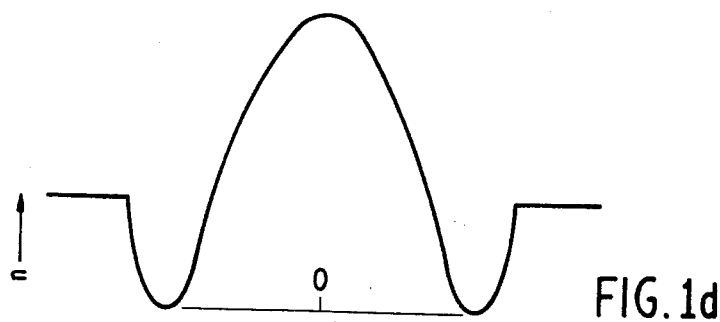

Particularly preferred as light-conducting cores are those disclosed in DAS No. 2,546,162 and its British and U.S. equivalents cited above. These cores are composed of a series of layers, each layer having a composition different from the others so that the index of refraction profile is that of a parabola, with the index increasing toward the center of the rod as shown in FIG. 1b. Each layer has at least three oxidic components whose concentration varies within the coating, a first oxidic component having a lower refractive index than a second oxidic component, and the third oxidic component and any further oxidic component having a higher refractive index than the second oxidic component. Preferably the third oxidic component and any further oxidic component has a cation showing a higher capacity for diffusion into the first oxidic component than into the second oxidic component. The refractive index of the second oxidic component is preferably higher than 1.660. The third oxidic component may have a cation showing a diffusion coefficient in silica which is higher than $3 \times 10^{-8}$ cm$^2$/sec. Preferably the concentration of the different oxidic components in the coating changes continuously through the coating. The first component may consist of for instance $SiO_2$ or $GeO_2$ or a mixture thereof. The second component may consist of $GeO_2$ (if this is not the first component) or $P_2O_5$ or a mixture thereof. The third component may be $Sb_2O_3$ and various other oxides mentioned in the tables of DAS No. 2,546,162 and its British and U.S. equivalents. Typical ternary systems are $SiO_2/GeO_2/P_2O_5$; $SiO_2/GeO_2/Sb_2O_3$; etc. Many multicomponent systems are possible as disclosed in the above-cited references, the disclosures of which are incorporated by reference to supplement the disclosure herein regarding the composition and fabrication of these light-conducting multicomponent cores. Usually, from 20–200 layers, preferably 70–100 layers are deposited. The thickness of each layer is 3–7 μm, preferably 2–4 μm and generally is more or less constant and not critical within these limits.

The method generally used to apply the multicomponent oxide glass layers is the conventional chemical vapor deposition technique, e.g., described by David Pearson, "Glass Fiber Waveguides for Optical Communication Applications", Appl. Solid State Sciences, 1976, 6, 173–242 whose disclosure is incorporated by reference herein, whereby the corresponding halide, for example, is decomposed in the vapor state, generally in the presence of oxygen as a carrier gas. The method is well known and is described in detail in the above-cited DAS and corresponding U.S. and British patent applications as applied to the production of multicomponent glass cores on the inside surfaces of glass tubes and in U.S. Pat. No. 3,711,262 as applied to internal coating of tubes in general.

An apparatus which can be used in this process is one in which the gas mixture flows through a rotating silica glass tube. The composition of the gas mixture is precisely controlled by conventional gas regulation methods. A centrally located burner, travelling along the longitudinal axis of the tube on its outer periphery, heats the tube locally to the desired temperature for deposition of the oxide mixture, formed by decomposition by pyrolysis, whose composition is readily predetermined by the index of refraction desired for the particular layer. In order to achieve any desired layer thickness and/or tube temperature, the system parameters are suitably adjusted in accordance with fully conventional considerations as disclosed, e.g., in D. Pearson (see above) or MacChesney & O'Connor, Preparation of Low Loss Optical Fibers Using Simultaneous Vapor Phase Deposition and Fusion, 10th Int. Congress on Glass, 1974, Proceedings page 6–40 to 6–45. which are incorporated by reference herein. Such parameters include the velocity of the burner (e.g., 0.15–3 m/min), the temperature of the burner (2100°–2150° C.), the width of the burner (1–8 cm), the overall gas flow rate (100–1000 ml/min) and/or pressures (800–1000 mmHg), carrier gas (e.g. $O_2$) temperatures (20°–30° C.), the width of the heated zone in the tube (2–5 cm), the rate of tube rotation (50–200 rpm), etc. Of course, the individual flow rates of the component gases are determined by the concentration of each cation oxide to be incorporated in each layer in combination with the temperature at which the source material (e.g., halide) is kept (e.g., 30°–70° C.).

An apparatus suitable for use in this process can be easily constructed by clamping a silica glass tube on a commercially available synchronous lathe made for use with glass (e.g., Synchronlathe, supplied by Heathway Co., Huntington, England). To avoid undesired condensation of high temperature vaporizing components, the entire tube-deposition system is normally enclosed in a conventional heating jacket.

Silica glass tubes such as Heralux WG, Vitreosil, Quartz & Silice, Amersil TO8 are suitable for use. Tubes having outer diameters of 10–+mm, preferably 14–20 mm, and wall thicknesses of 0.8–2.- mm, preferably 1.4–1.7 mm, can be used. Normally, tubes 1000–1500 cm long are employed. Purity of the various starting materials required in the process is as conventional, i.e., as high as possible, typically analytical grade reagents.

The production of cores suitable for the transmission of optical communication is effected in most cases by CVD pyrolysis (with the addition of oxygen) of $SiCl_4$, $BCl_3$, $POCl_3$, $GeCl_4$, and other metal chlorides, preferably those which are liquid at room temperature. Also the addition of $SbCl_5$ has already been proposed (as a third component in DAS No. 2,546,162), but, most importantly, only for the core material, not for the purpose of stabilization against nuclear radiation, and generally in large quantities.

Such normal CVD processes employ tube temperatures of about 700°–1600° C. The process of DAS No. 2,546,162 uses the highest prior art temperatures for the fabrication of silica optical fibers, i.e., 1550°–1600° C. However, the preferred process for use in conjunction with the fabrication of the optical fibers of this invention is the Schott High Temperature CVD Process, disclosed in copending U.S. application Ser. No. 941,692, filed on Sept. 12, 1978, whose disclosure is incorporated by reference herein. It uses high temperatures heretofore never attempted for CVD on silica glass tubes, i.e., about 1850°–2150° C., preferably 1950°–2050° C. Using such high temperatures, optical fibers of superior purity are produced with high pyrolysis yields, i.e., essentially all of the input cations are deposited on the tubular substrate.

(The upper limit on this range of higher temperatures is not critical but simply represents a convenient value. Higher temperatures may be employed as long as other parameters are correspondingly adjusted to avoid undue tube collapse, e.g., as long as the burner velocity can be suitably increased without any attendant difficulties.)

For this high temperature CVD technique, the same apparatus and conventional considerations discussed above are employed. However, due to the higher tube temperatures, higher burner temperatures (2000°–2300° C., preferably 2100°–2150° C.) in combination with higher burner travel velocities (25–35 cm/min, preferably 28–33 cm/min), narrower burner widths (3–5 cm) and/or narrower heated zones on the tubes (3–5 cm) must be used in order to ensure prevention of undue premature collapse of the optical fiber due to the surface tension of the silica glass tube at such high temperatures.

The borosilicate light insulating layer has to be deposited using the same CVD process, the Schott High Temperature CVD Process being preferred. The thickness of such optical insulation zones is generally 3–7 μm, preferably 5–6 μm. The zones can be composed of one layer of essentially constant composition, and thus index of refraction, producing rectangular profiles (FIG. 1b) or can be composed of a series of layers of varying composition, producing profiles as desired, e.g., those of FIGS. 1c and 1d. Appropriate system parameters can be easily and conventionally determined in accordance with the above discussion. Typically, from 70–150 layers of thickness 4–7 μm, are deposited. The appropriate borosilicate compositions are disclosed, for example, in British Pat. No. 1,436,605. Decomposable boron compounds for use in the CVD method include, e.g., $BCl_3$ or $BBr_3$.

The light-conducting core of multicomponent glass and the borosilicate glass optical insulating zone of especially low index of refraction (smaller than that of glassy $SiO_2$), are housed together in an additional $SiO_2$ glass sheath provided by the silica glass tube required by the manufacturing technology used for the inner coating CVD technique. Such solid glass tubes are fully conventional.

After deposition of both the core and cladding, the tube is conventionally collapsed and then drawn.

Collapsing is effected in stages by raising the tube temperature to greater than 2150° C., e.g., >2150°–2350° C., whereby the surface tension of the tube increases. This is most easily accomplished by decreasing the burner velocity to values of 5–10 cm/min. In each collapsing stage, the outer diameter of the tube, and, thus, the inner diameter of the tube ignoring the existence of the core layers, is reduced by a factor of about one-half. Generally, 1–6 stages are used to fully collapse the tube, in each stage the burner velocity being decreased by approximately 3–10 cm/min, i.e., the tube temperature being increased by 100°–150° C. in each stage. In the first stage a temperature of 2150°–2200° C. is used. During each stage, a stream of pure oxygen is passed through the tube. Initially the flow rate of the oxygen is 5–500 ml/min. This flow rate is decreased in each step by the same factor by which the tube diameter is decreased, i.e., by approximately one-half. Just before the last stage, i.e., elimination of the last internal cavity (a capillary), the oxygen flow is eliminated.

Collapsing of the tube is done as described in copending application Ser. No. 941,692, filed on Sept. 12, 1978 when the High Temperature Schott process is used. Otherwise, it is fully conventional.

The collapsed fiber can be drawn by fully conventional techniques, e.g., as disclosed by David Pearson, Appl. Solid State Sciences, 1976, 6, 173–242, which is incorporated by reference herein. Typical optical fiber diameters are 50–290 μm, preferably 60–150 μm.

During the fabrication of the fiber, temperatures are measured using fully conventional techniques or preferably as described in copending application Ser. No. 941,692, filed on Sept. 12, 1978.

It has now been found that optical fibers can be greatly stabilized with respect to dosages of nuclear radiation of more than $10^4$ rad, e.g., $5 \times 10^4$–$8 \times 10^4$ rad, by incorporation of $Sb_2O_3$ into both the borosilicate optical insulation zone and the light-conducting core of the fiber. This discovery was unexpected not only because such an effect was unknown before, but especially also since $Sb_2O_3$ has a high refractive index and would, therefore, not otherwise be added to the borosilicate optical insulation zone which, of course, derives its usefulness from its low index of refraction.

Generally, the amount of $Sb_2O_3$ incorporated into either zone may be 0.002–6 wt.% based on the total weight of the respective zone. The amount preferred for the borosilicate glass zone is 0.002–2.9 wt.%, especially 0.02–2.9 wt.%, most preferably 0.5–1.0 wt.%, to avoid undue increases in the refractive index of this light trapping zone. For the light-conducting core, the preferred amount is 0.002–2.9 wt.%, especially 0.02–2.9 wt.%, most preferably 1.5–2.9 wt.%. It is especially preferred that both the core glass and the borosilicate glass have about the same $Sb_2O_3$ content.

For this invention, the required $Sb_2O_3$ content should be incorporated in all layers of both glasses and should, of course, be essentially uniformly distributed therein as for any other glass component.

It is preferred that the $Sb_2O_3$ component be incorporated in the light-conducting core, preferably a multicomponent glass core, and in the borosilicate glass cladding by using the same CVD processes described above, preferably the Schott High Temperature CVD Process. Using such techniques, the amounts of $Sb_2O_3$ required by this invention can be incorporated in both the optical insulation zone and the light-conducting core very easily by adjusting the various process conditions and parameters using fully conventional considerations in view of the above discussion, e.g., using $SbCl_5$ as a starting material.

It is to be emphasized that addition of $Sb_2O_3$ to the light-conducting core, e.g., of multicomponent glass, by itself is orders of magnitude less effective than addition to both core and cladding. This is true despite the fact that the low-refractive index optical insulating zone of borosilicate glass is generally intended for coupling out vagrant modes and thus to achieve a reduction in pulse dispersion. It has been discovered that the nature of the stabilization achieved depends heavily on whether or not the optical insulating zone of borosilicate glass is also stabilized with $Sb_2O_3$. Addition of $Sb_2O_3$ to both core and borosilicate glass is particularly critical if the stabilization by antimony oxide is to be effective against radiation intensities of above $10^3$ rad.

The present invention provides optical fibers which are stable against a wide variety of nuclear radiations, including α, β, γ neutrons, etc., the dosages of which may be imposed over short (hours) or long (days, etc.) times. In order to demonstrate the phenomenon which underlies the present invention, a series of experiments was performed using a nuclear radiation load distributed over a wide range of the electromagnetic spectrum from a Synchotron. Irradiation periods of less than 24 hours were used, i.e., less than 2 hours (0.2–1.6 hours). The use of longer periods of irradiation would obfuscate the results since by the end of the periods of such longer bombardments, the glass can at least partially recover from the damage done in the early stages of the irradiation. Consequently, more than a simple increase in dosage and attendant damage is effected, so that simulation of the effects of higher energy sources cannot be achieved in this way. However, fibers which are shown to be stabilized against short-term high doses will also be stable with respect to long-term irradiations.

The fiber bombarded with this irradiation had a multicomponent glass light-conducting core (for example 43 individual layers; average thickness: 7 μm) surrounded by an optical insulation zone of borosilicate glass (approximately 91 wt.% $SiO_2$ and about 9% $B_2O_3$; thickness: 5 μm). The basic composition of the multi-component core varied stepwise and linearly from a first layer of about 72% $SiO_2$, 10% $GeO_2$ and 18% $P_2O_5$ to a fiber axis composition of about 52% $SiO_2$, 40% $GeO_2$ and 8% $P_2O_5$. Three fibers having this basic composition were produced: I [this invention]—contained 0.0119% by weight of the total light-conducting core, of $Sb_2O_2$ in its core and 0.009% by weight of the total optical insulation zone, of $Sb_2O_3$ in the optical insulation zone; II—contained the same amount of stabilizing $Sb_2O_3$ in its core as I did, but no $Sb_2O_3$ in the optical insulation zone; and III—the composition was that of the basic fiber; no $Sb_2O_3$ was added. The compositions of all three fibers, other than as stated above, differed only insubstantially from each other, e.g., technologically caused fluctuations in the compositions regarding the content of $P_2O_5$, i.e., in the stream of $POCl_3$ prior to pyrolysis, <2%. In other words, they were the same in basic composition within experimental error.

Figure 2:
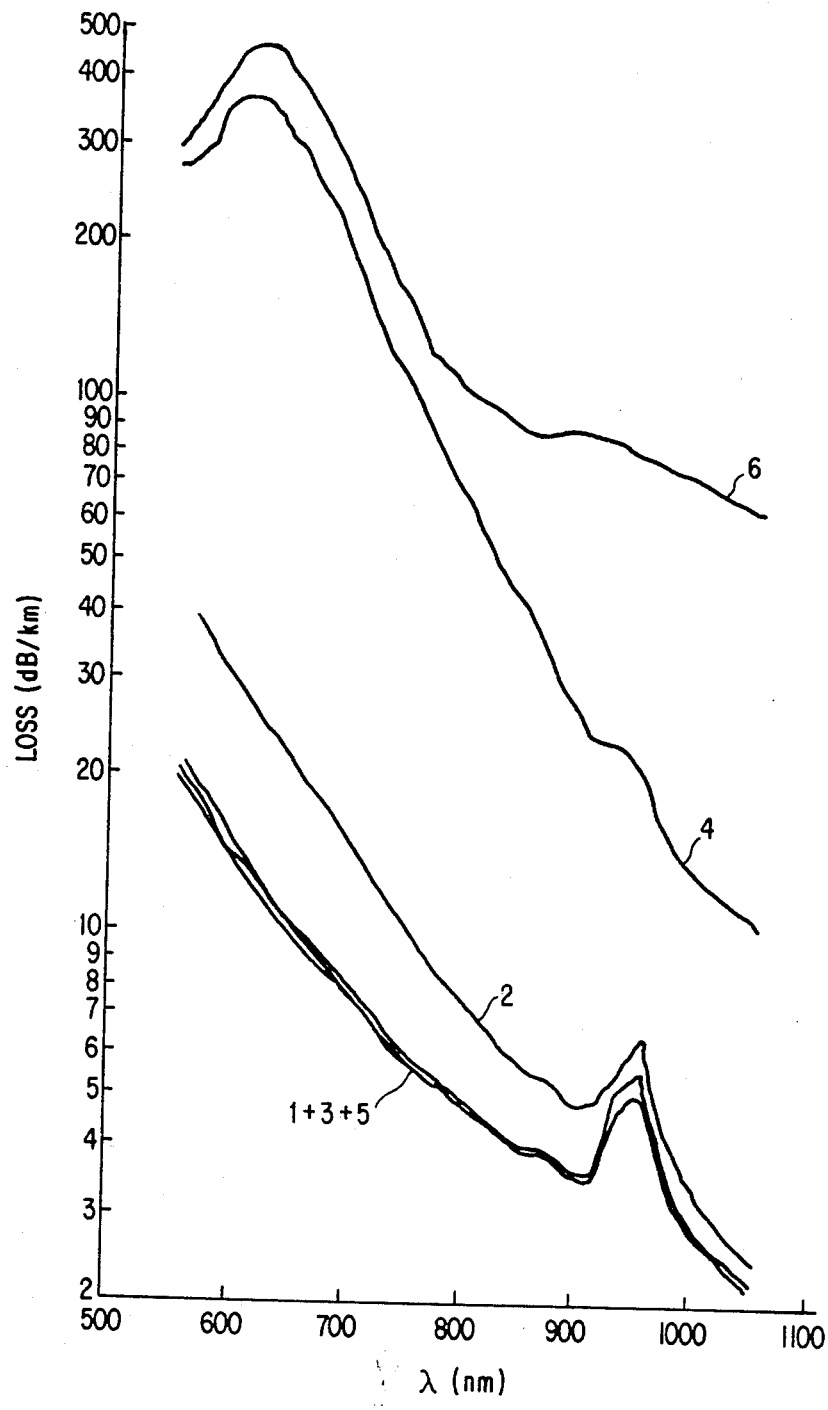
FIG. 2 illustrates transmission curves of three fibers before and after irradiation: I (this invention; 1-before; 2-after); II (3-before; 4-after); and III (5-before; 6-after).

The results are given in FIG. 2 which shows the transmission (db/km) of each fiber as a function of wavelength (nm). Curve 1 is for the unirradiated fiber of this invention and curve 2 is for the irradiated fiber of this invention. As can be seen, high transmission efficiency is maintained after the nuclear bombardment. This effect is especially significant in the spectral region above 800 nm within which falls the output of most optical communication sources (e.g., LED's and lasers). In contrast, the good transmission of fibers II ($Sb_2O_3$ in core only) and III (no $Sb_2O_3$) prior to irradiation (curves 3 and 5, respectively) is lost upon irradiation (curves 4 and 6, respectively). The nature of the large improvement which is derived from the incorporation of $Sb_2O_3$ in both the core and the insulation zone is thus easily seen.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The temperature of the tube is controlled by means of pyrometers. These pyrometers give their signals to electronically controlled flow meters for the burning gases, Eg.$H_2$ and $O_2$.

That means: faster burner velocity is not influencing temperature of deposition, because more energy is used by the burner with higher velocities.

Only the thickness of layers deposited is influenced by the burner velocity, resulting in different core thickness, but these values are not essential for the invention.

EXAMPLE 1

A quartz tube Heralux WG (Heraeus Quarzschmelze, Hanau) having a length of 1,000 mm, an outer diameter of 14 mm, and a wall thickness of 1.2 mm, is clamped onto a synchronized lathe and connected to a gas manifold system. While 500 ml/min of (room temperature) $O_2$, purified and additionally dried by passing through a molecular sieve (quality 4.5), flows through the tube, the latter being rotated at 100 r.p.m., the quartz tube is annealed with an oxyhydrogen gas burner at 2,050° C. The flame of this burner sweeps the tube at 2 m/min.

Other system parameters were:
(a) burner temperature—2100° C.
(b) width of burner—40 mm
(c) width of heated zone on tube—30 mm
(d) $O_2$ temperature—20° C.

Subsequently, 30 layers of a low-refractive index glass, consisting of 30% by weight of $B_2O_3$, 1% by weight of $Sb_2O_3$, and 69% by weight of $SiO_2$, are deposited at 1,850°-2,050° C. on the inner tube wall by the pyrolytic decomposition of $BCl_3$, $SbCl_5$, and $SiCl_4/O_2$ aerosols (average layer thickness: 5 μm; flow rates: $BCl_3$-20 ml/min; $SbCl_5/O_2$-50 ml/min; $SiCl_4/O_2$-150 ml/min.). Then, the $BCl_3$ stream is interrupted and the buildup of the light-conducting core material is begun at a somewhat higher temperature of 2,070° C. by decreasing the burner velocity to 150 cm/min. By way of the gas-generating vessels, attached to the gas manifold, kept at a temperature of 50° C., 107 ml/min of $O_2$ flow through $SiCl_4$ (Wacker Chemietronic Quality RSQ), 50 ml/min of $O_2$ flow through $POCl_3$ (MERCK Quality Optipur), 12 ml/min of $O_2$ flow through $GeCl_4$ (MERCK Quality Optipur), and 2.5 ml/min of $O_2$ flow through $SbCl_5$ (Riedel-de Haën). The aerosols are pyrolytically decomposed in the tube at 2,070° C. and the layer is molten to the vitreous state on the inner wall of the tube. During the buildup of the 70 core layers, (average thickness: 5-7 μm) the amount of $O_2$ flowing through the $GeCl_4$ and $SbCl_5$ vessels is linearly increased to 98 ml/min. of $O_2$ in the case of $GeCl_4$ and to 51 ml/min of $O_2$ in the case of $SbCl_5$. Thereby, the refractive index rises during the core buildup from 1.527 in the first glassy layer to 1.587 in the last, whereas the concentration of $Sb_2O_3$ in the glass rises from 0.02% to 1.5% by weight of the total weight of each layer.

The increase in the $Sb_2O_3$ content in successive layers is effected in order to achieve the desired refractive index profile—not as a requirement to achieve the stabilization effects of this invention. As mentioned previously, for stabilization purposes, the $Sb_2O_3$ would be evenly distributed throughout the various layers—as it is in the borosilicate layers, and would be in the core layers had $Sb_2O_3$ not been used as the "third component"-type of DAS No. 2,546,162 in this Example. That is, this fiber has a multicomponent core based on a $SiO_2/P_2O_5$-$GeO_2/Sb_2O_3$ system. Cores not containing amounts of $Sb_2O_3$ sufficient to achieve the stabilization of this invention, of course, must have effective amounts of $Sb_2O_3$ added.

After the core buildup, the tube is collapsed stepwise to obtain a rod by increasing the temperature to 2,300° C. This rod has an outer diameter of 8 mm, a core diameter of 4.3 mm, and a useful length of 530 mm. The rod is subsequently drawn to obtain a fiber of diameter 135 μm.

EXAMPLE 2

A quartz tube (Amersil) having a length of 1,250 mm, an outer diameter of 20 mm, and a wall thickness of 2.0 mm, is flushed with a 10% hydrofluoric acid solution, p.a., (pro analysis), additionally purged with distilled $H_2O$ and distilled $CH_3OH$, and dried with dry $N_2$. This tube is clamped into a synchronized lathe, connected to the gas handling apparatus, and rotated at 57 r.p.m. By means of an oxygen/propane burner with a velocity of 1.3 m/min., the tube is preannealed to 2,100° C. During this step, the tube is traversed by 400 ml/min of $O_2$ (quality 4.5), 100 ml/min of $N_2$ (quality 5.0), and 50 ml/min of He (quality 6.0). The gases are first passed through a "Milipore" filter having a "Teflon" diaphragm. Thereafter, 10 layers of $SiO_2$ and $Sb_2O_3$ are baked on at 2,100° C.

Other system parameters were:
(a) burner temperature—2150° C.
(b) width of burner—50 mm
(c) width of heated zone on tube—40 mm
(d) $O_2$ temperature—30° C.

For this purpose, 100 ml/min of $O_2$ is passed through $SiCl_4$ (FLUKA) kept at a temperature of 30° C. and the same amount through $SbCl_5$ (MERCK) kept at a temperature of 80° C. and the aerosol is pyrolytically decomposed in the tube. Thereafter, 75 ml/min of $POCl_3$ aerosol is added thereto in metered amounts. Furthermore, starting with this point in time, 50 ml/min of $O_2$ is passed through $SbCl_5$, kept at a temperature of 93° C., and added in metered amounts and the burner speed is increased to 1.5 m/min. From the charged gaseous stream, the oxides are deposited at 2,010° C. and molten to a glassy state on the inner wall of the tube. During the further buildup of the core gradient, the amount of $O_2$ flowing through the $SbCl_5$ is increased parabolically over 53 layers to 390 ml/min $O_2$. During this step, the content of $SbCl_5$ rises from 0.2% to 2.9% by weight based on the total weight of each layer. The refractive index correspondingly rises from 1.518 to 1.531. The multicomponent glass system of this example is thus $SiO_2/P_2O_5/Sb_2O_3$. After the core buildup is completed, the diameter of the tube and the thickness of the layers are reduced by a factor of about one-half during each collapsing step in which the tube is heated up to 2,250° C. by reducing the ratio of the burner advance to 1.1 m/min. The tube, collapsed into a preform, has an outer diameter of 10 mm and a core diameter of 3.2 mm. The useful length is 690 mm. The preform is subsequently drawn into a fiber of 140 μm in diameter.

In accordance with these examples, light-conducting fibers for the transmission of communication can be produced which withstand more than $10^3$ rad of short-term exposure without strongly lessening their transmission in the infrared range of the spectrum.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In an optical fiber comprising a light-conducting core and a borosilicate glass optical insulation cladding thereon, the improvement wherein the core and the cladding contain an amount of $Sb_2O_3$ effective to harden the fiber against nuclear radiation.

2. The optical fiber of claim 1, wherein the amount of $Sb_2O_3$ in the core is 0.002–6% by weight of the core and in the cladding is 0.002–6% by weight of the cladding.

3. The optical fiber of claim 2, wherein the amount of $Sb_2O_3$ in the borosilicate cladding is 0.002–2.9% by weight.

4. The optical fiber of claim 3, wherein the amount of $Sb_2O_3$ in the core is about the same as the amount in the borosilicate cladding.

5. The optical fiber of claim 1, wherein the light-conducting core comprises a series of multi-component glass layers which produce a parabolic refractive index profile for the fiber.

6. The optical fiber of claim 1, wherein the borosilicate glass cladding and the light-conducting core have been deposited by CVD using a substrate deposition temperature of 1850°–2150° C.

7. The optical fiber of claim 1 which has been exposed to nuclear radiation.

8. The optical fiber of claim 1, wherein said borosilicate glass consists essentially of $B_2O_3$ and $SiO_2$.

9. In the production of known optical fibers comprising a light-conducting core and a borosilicate glass cladding and which contain essentially no $Sb_2O_3$, the improvement which comprises incorporating in either the core or the cladding or both an amount of $Sb_2O_3$ effective to harden the fiber against nuclear radiation.

10. The optical fiber of claim 9, wherein only the cladding contains such an effective amount of $Sb_2O_3$.

11. The optical fiber production of claim 9, wherein said borosilicate glass consistes essentially of $B_2O_3$ and $SiO_2$ and wherein said amount of $Sb_2O_3$ is incorporated in the cladding or in both of the cladding and the core.

12. In a communication transmitting optical fiber having a light-conducting core comprising a series of layers of multi-component glass producing a parabolic refractive index profile for the fiber; an outer $SiO_2$ glass sheath; and an intermediate borosilicate glass light-insulating cladding, the improvement wherein both the core and the cladding each contain 0.002–6.0 wt.% of $Sb_2O_3$ and all components of the core and the cladding have been deposited by CVD using a substrate deposition temperature of 1850°–2150° C.

13. The optical fiber of claim 12, wherein said borosilicate glass consists essentially of $B_2O_3$ and $SiO_2$.

14. In a method of transmitting electromagnetic radiation through an optical fiber during and after exposure to nuclear radiation, the improvement wherein said optical fiber comprises a light-conducting core and a borosilicate glass optical insulation cladding, said core and cladding containing an amount of $Sb_2O_3$ effective to harden the fiber against nuclear radiation.

15. The method of claim 14, wherein said borosilicate glass consists essentially of $B_2O_3$ and $SiO_2$.

* * * * *